United States Patent Office 2,904,605  
Patented Sept. 15, 1959

2,904,605

PROCESS FOR THE PRODUCTION OF p-XYLENE

Georg Schäfer, Marl in Westphalia, Germany, assignor to Chemische Werke Huls Aktiengesellschaft, Marl, Kreis Recklinghausen, Germany, a corporation of Germany No Drawing. Application April 21, 1955
Serial No. 503,035

Claims priority, application Germany April 24, 1954

3 Claims. (Cl. 260—668)

p-Xylene is of great importance as a starting material in the production of synthetic fibers from terephthalic acid. It must have a very high degree of purity for use in the process. The production of pure p-xylene from the xylene fraction of tars or from mineral oil fractions which have been subjected to a catalytic or thermic dehydrogenation and cyclization is not possible by simple distillation. Cumbersome and costly chemical or physical purification processes must be resorted to in order to obtain p-xylene which is sufficiently free of ever present isomers and other impurities.

In accordance with the present invention it has been found that p-xylene practically free of isomers can be produced by heating a compound of the group embraced by the general formula

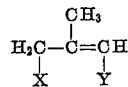

in which stands for a member of the group consisting of bromine and chlorine and Y stands for a member of the group consisting of hydrogen, bromine and chlorine in the vapor state at a temperature within the range from about 400° C. to about 800° C. To effect the pyrolysis vapors of said compound, either in the pure state or diluted with hydrogen, nitrogen, carbon monoxide or carbon dioxide are passed through a heated chamber with or without the presence of contact bodies or catalysts. Hydrogen halide is split off and the fragments of the molecule combine with the liberation of hydrogen to form the p-xylene and high boiling compounds some of which still contain halogen. Among the by-products are a small amount of toluene as well as non-aromatic unsaturated compounds, especially when the process is carried out in the absence of catalysts.

The course of the reaction is illustrated by the following reaction equation:

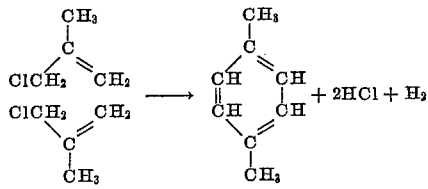

The pyrolysis temperature lies within the range from about 400° C. to about 800° C. and preferably within the range from 450° C. to 600° C. The operating temperature depends in each instance upon the nature of the halogenide being treated and upon the presence or absence of a catalyst. In order to discourage side reactions it is advisable to select the reaction conditions such that only a part of the halogenide, e.g. 40–60% of the total charge is converted at each pass through the reaction zone, the unreacted portion being recovered and recirculated.

Suitable halogenides for use in the process of the invention are, for example, 3-chloro-2-methylpropene-1, 3-bromo-2-methylpropene-1 and 1.3-dichloro-2-methylpropene-1.

The thermal treatment of the halogenides can be carried out by passing their vapors through a heated tube or through a chamber filled with lumps of an inert non-catalytic contact material such as porcelain balls, quartz pieces, sand, gravel, corundum, Carborundum, pumice and coke or in contact with a catalyst. The vapor of the halogenide can be brought into contact with a moving mass or bed of a heated solid inert heat carrier or catalyst or it may be introduced into a fluidised bed of fine grained material, which again may be either catalytically active or inert.

The reaction of the halogenide may be purely thermal or the reaction conditions may be modified by the use of catalysts which promote the splitting off of hydrogen halide or the aromatization or both. Suitable catalysts are highly porous materials such as kieselguhr, silica gel, activated alumina, activated clays and natural or synthetic alumina hydrosilicates and metal halides, especially the halides of the alkali and alkaline earth metals, copper, zinc, cadmium, bismuth, chromium or mixtures of such metal halides, and noble metals, especially palladium and platinum either in solid compact form or in finely divided form on a carrier.

The gas mixture leaving the reaction zone is cooled and subjected to condensation. The uncondensed gases are washed to remove hydrogen halogenide and the residual gas consisting of hydrogen and normally gaseous hydrocarbons may be recirculated as diluting gas or used for any other purpose or discarded. The liquid reaction product obtained by the cooling and condensation as described above is fractionated into a first fraction consisting principally of unreacted starting material, a second fraction containing toluene which is either discarded or used for other purposes, the xylene fraction and the residual oil fraction. The xylene fraction contains generally a small amount of unsaturated impurities which darken on standing. Such impurities can be removed by treatment with a small amount of 88–96% sulfuric acid and if necessary by a subsequent heating with bleaching earth. The remaining p-xylene is pure as is indicated by its infrared and ultraviolet absorption spectra as well as by its other physical and chemical characteristics. Spectroscopically only traces of toluene could be detected as impurity and in some instances, namely when the pyrolysis was carried out under more severe conditions, small amounts, less than 0.5% of m-xylene which is formed by the isomerization of the p-xylene were present.

The invention is further disclosed by the following illustrative examples:

Example 1

Methallyl chloride was vaporized and passed over pieces of solid calcium chloride at the rate of 800 grams per hour, per liter of catalyst, at a temperature of 490–500° C. 49.5% of the metallyl chloride was transformed. 26%, by weight, calculated on the weight of the methallyl chloride converted, of p-xylene was recovered corresponding to 45% of the theoretical yield. The ultraviolet spectrum of this product revealed a small amount of toluene but no isomers.

Example 2

180 g. of methallyl chloride was passed per hour in the form of vapor at a temperature of 480–500° C. through an electrically heated quartz tube 40 mm. in diameter and 1 m. long filled with quartz fragments. From 465 g. of methallyl chloride charged 366 g. of a dark liquid were obtained which upon fractionation yielded 274 g. of unreacted methallyl chloride, corresponding to a conversion of 41%, 72 g. a xylene fraction and 18 g. of higher boiling oil. The xylene fraction was shaken twice with about 3 ccm. of 96% sulfuric acid, heated to boiling with activated clay and finally rectified. The yield was 64 g. of pure p-xylene having a boiling point of 138° C. and $d_4^{20}$ 0.862 corresponding to 57% of the theoretical yield. The infra red absorption spectrum showed the bands of p-xylene while those of the isomers were completely absent.

*Example 3*

Methallyl chloride was passed at 510° C. at the rate of 400 g. per liter of reaction space per hour over sintered aluminum oxide of 3–5 mm. grain size. The vapor was condensed, the hydrogen chloride washed out and the resulting liquid reaction product fractionated. From 1000 g. of methallyl chloride were obtained:

526 g. of unreacted methallyl chloride
182 g. of xylene fraction, which by washing with sulfuric acid gave 160 g. of p-xylene, boiling point 138° C. $d_4^{20}$ 0.865
110 g. high boiling oil
15 g. coke and tar
121 g. HCl, and
46 g. of gaseous products and losses With a conversion of 47.4% the yield of p-xylene was 33.6% by weight of the reacted methallyl chloride or 57.5% of the theoretical yield.

I claim:
1. Process for the production of p-xylene which comprises heating a compound of the group embraced by the general formula

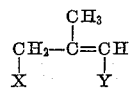

in which X stands for a member of the group consisting of bromine and chlorine and Y stands for a member of the group consisting of hydrogen, bromine and chlorine in vapor state as the sole reactive agent at a temperature within the range from about 400° C. to about 800° C.

2. Process as defined in claim 1 in which the compound is heated in the presence of an inert gas of the group consisting of hydrogen, nitrogen, carbon monoxide and carbon dioxide.

3. Process as defined in claim 1 in which the compound is heated in the presence of a catalytic material selected from the group consisting of kieselguhr, silica gel, activated alumina, activated clays, natural and synthetic alumina hydrosilicates, the halides of the alkali and alkaline earth metals, copper, zinc, cadmium, bismuth, and chromium, and the metals palladium and platinum.

References Cited in the file of this patent
UNITED STATES PATENTS
2,755,322    Rust et al. _____ July 17, 1956

OTHER REFERENCES
Howlett: J. Chem. Soc. (1952), pages 4487–4491.
Groggins: Unit Processes in Organic Synthesis, McGraw-Hill Book Co. (1952), page 221.